(12) United States Patent
Pemberton et al.

(10) Patent No.: US 11,408,513 B2
(45) Date of Patent: Aug. 9, 2022

(54) AVIATION VALVE WITH STATUS INDICATOR

(71) Applicant: GCE Holding AB, Malmö (SE)

(72) Inventors: Gareth Pemberton, Worcester (GB); Petr Jehlicka, Zdírec nad Doubravou (CZ); Karel Zmek, Malmö (SE)

(73) Assignee: GCE Holding, AB, Malmö (SE)

( * ) Notice: Subject to any disclaimer, the term of this patent is extended or adjusted under 35 U.S.C. 154(b) by 178 days.

(21) Appl. No.: 16/468,728

(22) PCT Filed: Dec. 21, 2016

(86) PCT No.: PCT/EP2016/082081
§ 371 (c)(1),
(2) Date: Jun. 12, 2019

(87) PCT Pub. No.: WO2018/113941
PCT Pub. Date: Jun. 28, 2018

(65) Prior Publication Data
US 2020/0011450 A1    Jan. 9, 2020

(51) Int. Cl.
*F16K 1/30* (2006.01)
*F16K 1/02* (2006.01)
(Continued)

(52) U.S. Cl.
CPC ............... *F16K 1/303* (2013.01); *F16K 1/02* (2013.01); *F16K 1/307* (2013.01); *F16K 11/161* (2013.01);
(Continued)

(58) Field of Classification Search
CPC ...... F17C 2205/0329; F17C 2205/0382; Y10T 137/7876; Y10T 137/7877;
(Continued)

(56) References Cited

U.S. PATENT DOCUMENTS 48,407 A * 6/1865 Jenkins ............... F16K 41/10
251/278
RE23,487 E * 4/1952 McCabe ................ F16K 1/307
222/547
(Continued)

FOREIGN PATENT DOCUMENTS

EP    2827214 A2    1/2015
GB    2045895 A    11/1980

OTHER PUBLICATIONS

International Search Report and Written Opinion for International Application No. PCT/EP2016/082081 dated Aug. 22, 2017, 6 pages.

*Primary Examiner* — Atif H Chaudry
(74) *Attorney, Agent, or Firm* — Edell, Shapiro & Finnan, LLC

(57) ABSTRACT

The invention relates to a shut-off valve for controlling flow of a pressurised gas. The shut-off valve comprises a body defining a passage extending between a gas inlet channel and a gas outlet channel, and a sealing element arranged to, in a first position, close the passage, and in a second position, open the passage to allow gas to flow between the gas inlet channel and the gas outlet channel through the passage. The invention also relates to a method for controlling flow of a pressurised gas by means of a shut-off valve.

20 Claims, 2 Drawing Sheets

(51) Int. Cl.
  *F16K 31/50* (2006.01)
  *F16K 15/18* (2006.01)
  *F16K 11/16* (2006.01)

(52) U.S. Cl.
  CPC .......... *F16K 15/1848* (2021.08); *F16K 31/50* (2013.01); *F17C 2205/0329* (2013.01); *F17C 2205/0332* (2013.01); *F17C 2205/0382* (2013.01); *Y10T 137/6106* (2015.04); *Y10T 137/7876* (2015.04); *Y10T 137/7877* (2015.04); *Y10T 137/87989* (2015.04); *Y10T 137/88046* (2015.04); *Y10T 137/88054* (2015.04)

(58) Field of Classification Search
  CPC ....... Y10T 137/6106; Y10T 137/88054; Y10T 137/88046; Y10T 137/87989; F16K 1/02; F16K 1/303; F16K 31/50; F16K 17/188; F16K 1/307; F16K 15/1848; F16K 11/161
  See application file for complete search history.

(56) References Cited

U.S. PATENT DOCUMENTS

| | | | | |
|---|---|---|---|---|
| 5,404,909 A | * | 4/1995 | Hanson | F16L 37/113 |
| | | | | 137/614.06 |
| 2015/0203278 A1 | * | 7/2015 | Koban | F16K 1/303 |
| | | | | 222/544 |
| 2016/0178084 A1 | * | 6/2016 | White | F04B 39/12 |
| | | | | 137/553 |

\* cited by examiner

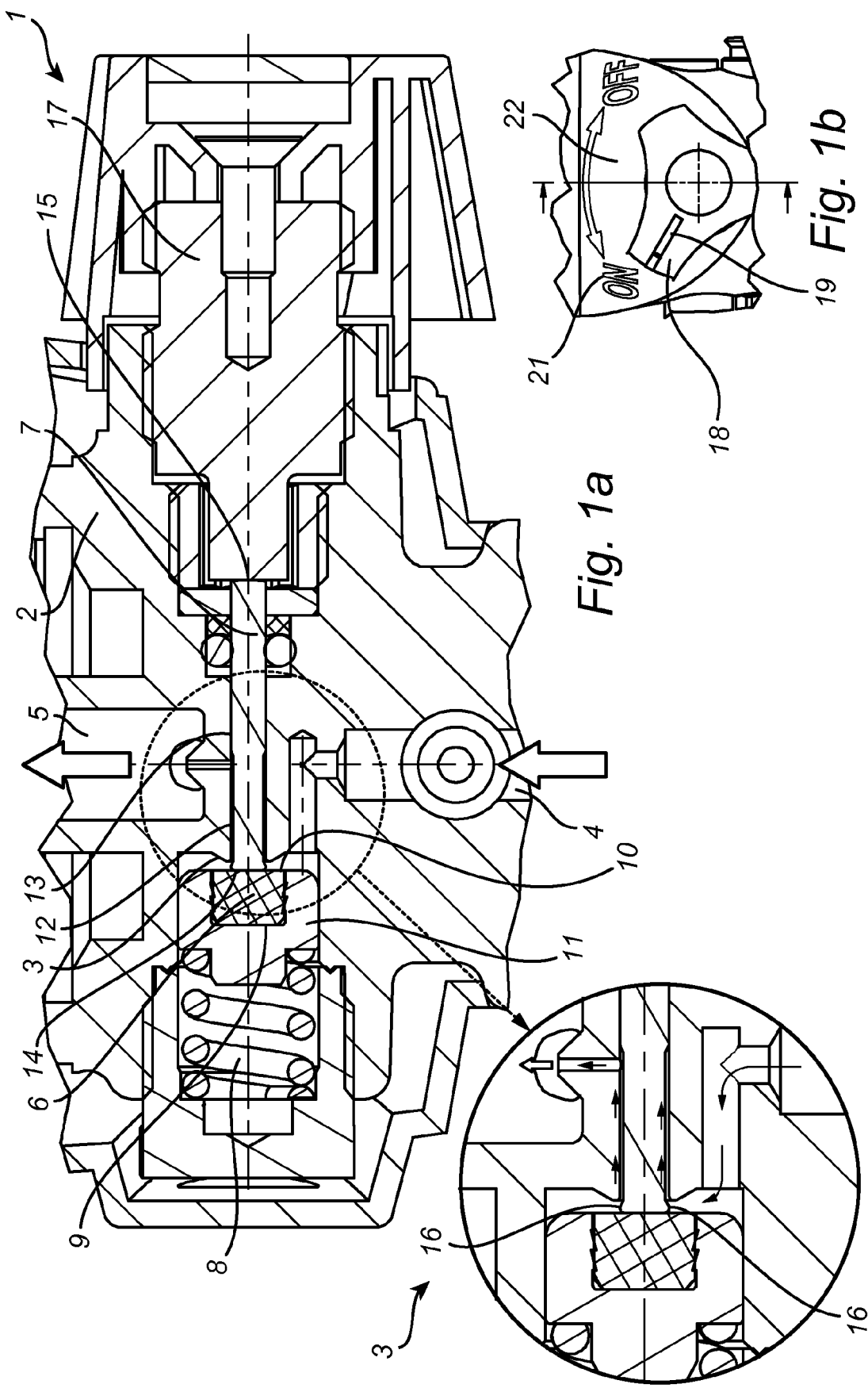

AVIATION VALVE WITH STATUS INDICATOR

TECHNICAL FIELD

The invention relates to a shut-off valve and a method for controlling flow of a pressurised gas.

BACKGROUND ART

Shut-off valves are commonly used for compressed gases. One example of such a valve is disclosed in DE 103 54 299 A1. However, there are several problems associated with known shut-off valves. For example, immediately after opening of the shut-off valve, the gas has a high speed. This may lead to particle impact ignition when the gas rapidly reaches non-pressurised areas as the gas may captive particles that, if they impact on some surface, may cause ignition as their kinetic energy is converted to heat.

Another problem which may arise is that adiabatic compression caused by the opening of the shut-off valve and gas entering non-pressurised areas may lead to increase in temperature of the gas for a moment. This increase in temperature may in some cases lead to the ignition of components. In particular, this is the case for components having a low auto-ignition temperature.

A further problem with conventional valves is that the closing of the same requires several turns of a hand wheel which is time consuming. Also, it is difficult for the user to determine if the valve is open or closed.

The above described problems particularly occur for shut-off valves used with highly oxidised gases, that is, gases having a higher share of oxygen than air, because higher oxygen content increase the probability of ignition.

There is thus a need for an improved shut-off valve for compressed gases.

SUMMARY OF THE INVENTION

It is an objective of the present invention to provide an improvement of the above technique and prior art. More particularly, it is an objective of this invention to provide an improved shut-off valve which mitigate, alleviate or eliminate one or more of the above-identified problems.

According to a first aspect, these and other objects, and/or advantages that will be apparent from the following description of embodiments, are achieved, in full or at least in part, by a shut-off valve for controlling flow of a pressurised gas. The shut-off valve comprises a body defining a passage extending between a gas inlet channel and a gas outlet channel, and a sealing element arranged to, in a first position, close the passage, and in a second position, open the passage to allow gas to flow between the gas inlet channel and the gas outlet channel through the passage. The shut-off valve further comprises a pin element at least partly arranged in the passage and connected to the sealing element, and a biasing element for biasing a first end of the sealing element such that a second end of the sealing element is in contact with the sealing pin element. The shut-off valve is characterised in that the pin element comprises a guide or guiding means for guiding a gas flow between the gas inlet channel and the gas outlet channel when the sealing element is in the second position, and in that the guiding means extends in the longitudinal direction of the pin element and being arranged to allow gas to leave the passage in a radial direction of the pin element.

Opening a valve often results in a sudden rush of fluid, while closing a valve often takes longer to stop the flow of fluid. The present shut-off valve enables closing a valve quickly but with a controlled slow opening. As the shut-off valve is opened by moving the sealing member from the first to the second position, gas may flow from the gas inlet to the gas outlet via the passage. Particularly, the gas flow is guided by the guide or guiding means of the pin element to leave the passage in a radial direction of the pin element. The design of the pin element will ensure that a quick start opening of the valve is avoided. The guide or guiding means of the pin element which is present in the passage will only allow lower gas flow through the limited area between external diameter of the pin element and the inner wall of the passage.

There is a further advantage in that an improved life for the valve components can be achieved as it is subjected to less intense pressure variations upon opening and closing of the valve.

The pin element may further comprise a restrictor or restriction means at the axial end which is in contact with the sealing element. The restrictor or restriction means extends along the circumference of the pin element and bear against the inner surface of the part of the passage which consists of an internal space in the valve body in which the pin element is at least partly located. When the movement of the pin element and thus the sealing element in an axial direction is big enough, the restrictor or restriction means goes outside of the internal space and thus full opening of the valve is achieved. The restrictor or restriction means is preferably tapering in an axial direction from the axial end which is in contact with the sealing element in order to further enhance the slow opening of the valve.

The design of the restrictor or restriction means provides for a slow opening but a quick closing of the shut-off valve. This is a big advantage as it reduces the adiabatic compression when opening the shut-off valve and hence reduces the risk of ignition.

In one preferred embodiment, the body comprises an inner threading and the pin element comprises an outer threading in engagement with the inner threading of the body. Here, rotation of the pin element in a first direction forces the sealing element from the first position to the second position, and rotation of the pin element in a second direction allows the sealing element to move from the second position to the first position by means of the biasing element.

In another preferred embodiment, the body comprises an inner threading, and the shut-off valve further comprises a rotation spindle connected to the pin element and having an outer threading in engagement with the inner threading of the body. Here, rotation of the rotation spindle in a first direction moves the sealing element from the first position to the second position via the pin element, and rotation of the rotation spindle in a second direction allows the sealing element to move from the second position to the first position by means of the biasing element.

The shut-off valve may further comprise a hand wheel which is connected to the pin element or to the rotation spindle. The hand wheel may have a marking which in combination with a printing (ON/OFF) on a different part of the shut-off valve constitutes a status indicator of the shut-off valve.

The inner and the outer threading may be a high-pitched threading, respectively. This enables opening and closing of the valve with minimum rotation (120 degrees). This is a particular user improvement since a reduced rotation leads to the system being in operation quicker than standard rotations (often greater than 360 degrees).

The shut-off valve may further comprise a lower spindle housing the sealing element and in connection with the biasing element.

The guide or guiding means may comprise a longitudinally extending recess formed in an outer surface of the pin element, wherein the outer surface extends between a first and a second axial end.

In one preferred embodiment, the gas inlet channel and the passage may be arranged essentially perpendicular to each other, the gas outlet channel and the passage may be arranged essentially perpendicular to each other, and the gas inlet channel and the gas outlet channel may be arranged in parallel with a distance between them, the distance being bridged by the passage.

According to a second aspect, these and other objects are achieved, in full or at least in part, by a method for controlling flow of a pressurised gas by means of a shut-off valve as described above. The method is characterised by the steps of opening the shut-off valve by rotating the pin element in relation to the body in a first direction, thereby forcing the sealing element from the first position to the second position and thus allowing gas to flow between the gas inlet channel and the gas outlet channel through the passage, and closing the shut-off valve by rotating the pin element in relation to the body in a second direction, thereby allowing the sealing element to move from the second position to the first position by means of the biasing element and thus prevent gas from flowing between the gas inlet channel and the gas outlet channel through the passage.

Effects and features of the second aspect of the present invention is largely analogous to those described above in connection with the first aspect the inventive concept. Embodiments mentioned in relation to the first aspect of the present invention are largely compatible with the further aspects of the invention.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

As used herein, the term "comprising" and variations of that term are not intended to exclude other additives, components, integers or steps.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals may be used for similar elements, and wherein:

FIG. 1a is cross sectional view of a shut-off valve according to an exemplary embodiment of a first aspect of the invention, when in an open state.

FIG. 1b is a side view of a hand wheel on the shut-off valve, when in the open state.

DETAILED DESCRIPTION OF PREFERRED EMBODIMENTS OF THE INVENTION

Figures 2A, 2B:
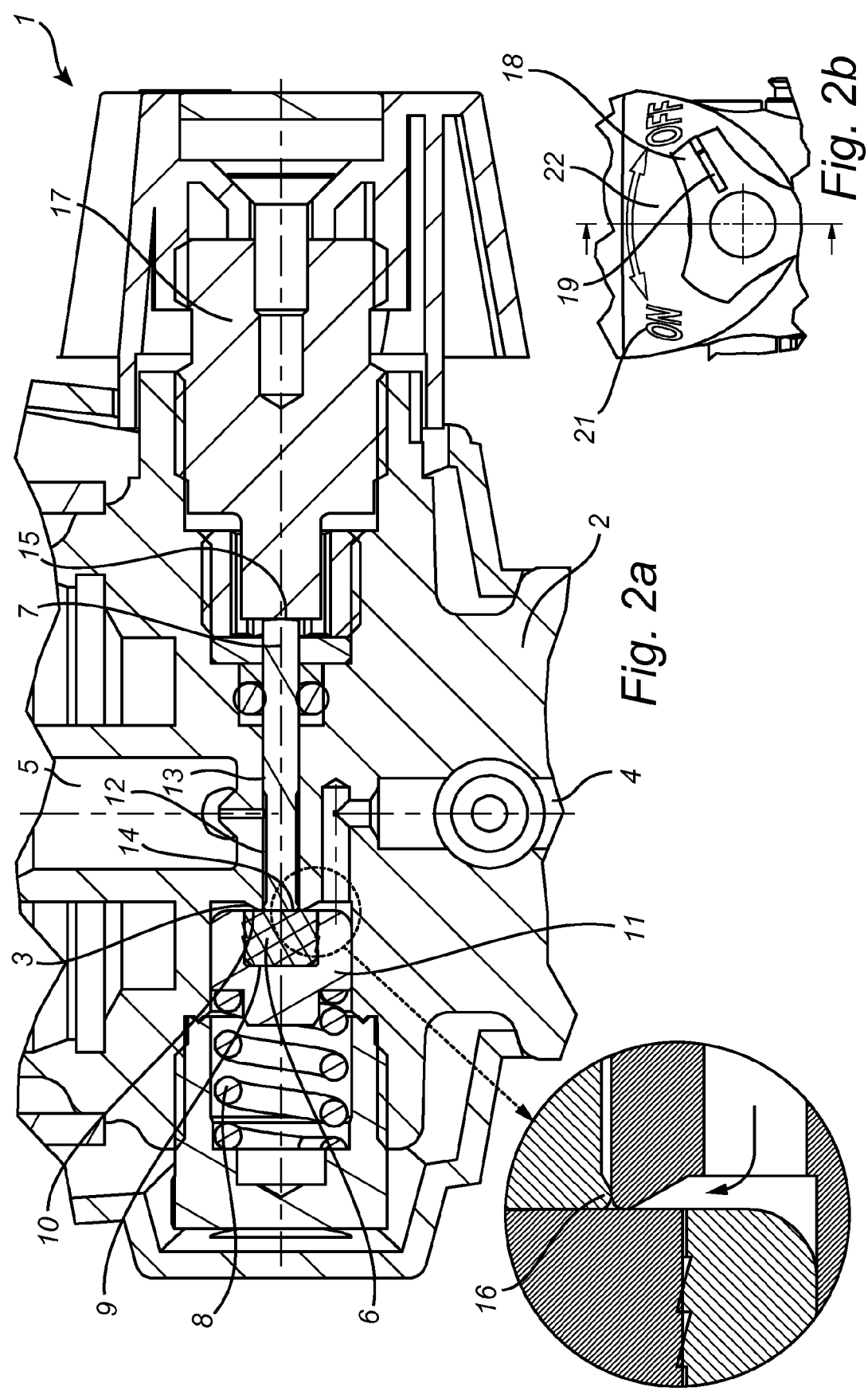
FIG. 2a is cross sectional view of the shut-off valve, when in a closed state.
FIG. 2b is a side view of the hand wheel, when in the closed state.

FIGS. 1a and 2a illustrate shut-off valve 1 for controlling flow of a pressurised gas according to an exemplary embodiment the invention. The shut-off valve 1 comprises a valve body 2 which defines a passage 3 extending between a gas inlet channel 4 and a gas outlet channel 5, and a sealing element 6 arranged to, in a first position (FIG. 1b), close the passage 3, and in a second position (FIG. 1a), open the passage 3 to allow gas to flow between the gas inlet channel 4 and the gas outlet channel 5 through the passage 3. The shut-off valve 1 further comprises a pin element 7 which is arranged in the passage 3 and connected to the sealing element 6, and a biasing element 8 for biasing a first end 9 of the sealing element 6 such that a second end 10 of the sealing element 6 is in contact with the pin element 7. Specifically, the shut-off valve 1 has a lower spindle 11 housing the sealing element 6 which is in direct connection with the biasing element 8.

The pin element 7 comprises guiding means 12 or guide 12 for guiding a gas flow between the gas inlet channel 4 and the gas outlet channel 5 when the sealing element 6 is in the second position. The guiding means 12 extends in the longitudinal direction of the pin element 7 and is arranged to allow gas to leave the passage in a radial direction of the pin element 7. The guiding means 12 comprises a longitudinally extending recess 13 formed in an outer surface of the pin element 7. The recess 13 extends a predetermined distance from a first end 14 of the pin element 7 towards a second end 15 of the pin element 7 in an axial direction.

The pin element 7 further comprises restriction means 16 or restrictor 16 at the first end 14 which is in contact with the sealing element 6. The restriction means 16 surrounds the pin element 7 in a circumferential direction and has a tapering shape from the first end 14 towards the second end 15 in the axial direction.

Both the gas inlet channel 4 and the passage 3, and gas outlet channel 5 and the passage 3 are arranged essentially perpendicular to each other. The gas inlet channel 4 and the gas outlet channel 5 are further arranged in parallel with a distance between them, where the distance is bridged by the passage 3.

The shut-off valve 1 further comprises a rotation spindle 17 which is in contact with the pin element 7 (in this embodiment, there is no permanent connection between the two components) and has an outer threading (not shown) in engagement with an inner threading (not shown) of the valve body 2. The inner threading and the outer threading both consist of a high-pitched threading. This is a particular user improvement since a reduced rotation leads to the valve 1 being in operation quicker than a conventional valve.

FIGS. 1b and 2b illustrate a hand wheel 18 on the shut-off valve 1. The hand wheel 18 is connected to the pin element 7 via to the rotation spindle 17 and comprises a marking 19 on the hand wheel 18 which in combination with a printing 21 on a static part 22 constitutes a status indicator for the shut-off valve 1. The status indicator indicates if the shut-off valve is in the open state (FIG. 1b) or in the closed state (FIG. 2b).

The following passages describes operation of the shut-off valve 1 according to one exemplary embodiment.

Opening and closing of the shut-off valve 1 is realised via the hand wheel 18, which is joined by screw with the rotation spindle 17. The rotation spindle 17 moves the sealing element 9 in axial direction via the pin element 7.

When the hand wheel 18 is rotated anticlockwise, the rotation spindle 17 is rotated as well and consequently moves together with the pin element 7 in the axial direction. Subsequently, the sealing element 6 is moved into the second position via the pin element 7 such that the passage 3 between the inlet channel 4 and the outlet channel 5 is open to allow medium to pass through.

When the hand wheel 18 is rotated clockwise, the rotation spindle 17 and the pin element 7 moves in the opposite axial direction so that the sealing element 6 is allowed to move back into the first position by means of the biasing force from the biasing element 8 acting upon the lower spindle 11, which houses the sealing element 6. Here, in the first position, the sealing element 9 is in engagement with the valve body 2 and thus the passage 3 between the inlet channel 4 and the outlet channel 5 is closed to stop medium from passing through.

The skilled person realises that a number of modifications of the embodiments described herein are possible without departing from the scope of the invention, which is defined in the appended claims.

For instance, in one specific embodiment, the pin element 7 comprises an outer threading in engagement with the inner threading of the body 2 Here, rotation of the pin element 7 in a first direction forces the sealing element 6 from the first position to the second position, and rotation of the pin element 7 in a second direction allows the sealing element 6 to move from the second position to the first position by means of the biasing element 8.

The invention claimed is:

1. A shut-off valve for controlling flow of a pressurised gas, comprising:
    a body defining a passage extending between a gas inlet channel and a gas outlet channel, the gas inlet channel being coaxial with the gas outlet channel, and the passage including a first conduit and a second conduit that each extend transversely to a direction which the gas inlet channel and the gas outlet channel extend;
    a sealing element arranged to, in a first position, close the second conduit, and in a second position, open the second conduit to allow gas to flow from the gas inlet channel to the gas outlet channel through the passage while reversing its flow direction when moving from the first conduit to the second conduit;
    a pin element at least partly arranged in the passage, the pin element including a restrictor at a first end which is in contact with the sealing element; and
    a biasing element for biasing a first end of the sealing element such that a second end of the sealing element is in contact with the pin element,
    wherein, the pin element comprises a guide for guiding a gas flow between the gas inlet channel and the gas outlet channel when the sealing element is in the second position, the guide extending in a longitudinal direction of the pin element and being arranged to allow the gas flow to leave the passage in a radial direction of the pin element, and wherein the sealing element and the restrictor both independently seal the second conduit when the sealing element is in the first position.

2. The shut-off valve according to claim 1, wherein the restrictor surrounds the pin element in a circumferential direction and is tapering in an axial direction from the first end.

3. The shut-off valve according to claim 1, wherein the body comprises an inner threading and the pin element comprises an outer threading in engagement with the inner threading of the body, and wherein rotation of the pin element in a first direction forces the sealing element from the first position to the second position, and rotation of the pin element in a second direction allows the sealing element to move from the second position to the first position by means of the biasing element.

4. The shut-off valve according to claim 3, further comprising a hand wheel being connected to the pin element.

5. The shut-off valve according to claim 4, wherein the hand wheel comprises a marking which, in combination with a printing on a different part of the shut-off valve, provides a status indicator of the shut-off valve.

6. The shut-off valve according to claim 3, wherein the inner threading and the outer threading are each high-pitched threading.

7. The shut-off valve according to claim 1, wherein:
    the body comprises an inner threading; and
    the shut-off valve further comprises a rotation spindle in contact with the pin element and having an outer threading in engagement with the inner threading of the body, and rotation of the rotation spindle in a first direction moves the sealing element from the first position to the second position via the pin element, and rotation of the rotation spindle in a second direction allows the sealing element to move from the second position to the first position by means of the biasing element.

8. The shut-off valve according to claim 7, further comprising a hand wheel being connected to the rotation spindle.

9. The shut-off valve according to claim 8, wherein the hand wheel comprises a marking which, in combination with a printing on a different part of the shut-off valve, provides a status indicator of the shut-off valve.

10. The shut-off valve according to claim 7, wherein the inner threading and the outer threading are each high-pitched threading.

11. The shut-off valve according to claim 1, further comprising a lower spindle housing the sealing element and in connection with the biasing element.

12. The shut-off valve according to claim 1, wherein the guide comprises a longitudinally extending recess formed in an outer surface of the pin element, the outer surface extending between a first and a second axial end of the pin element.

13. The shut-off valve according to claim 1, wherein the gas inlet channel and the passage are arranged essentially perpendicular to each other.

14. The shut-off valve according to claim 1, wherein the gas outlet channel and the passage are arranged essentially perpendicular to each other.

15. The shut-off valve according to claim 1, wherein the gas inlet channel and the gas outlet channel are arranged with a distance between them, the distance being bridged by the passage.

16. A method for controlling flow of a pressurised gas by with the shut-off valve of claim 1, comprising:
    opening the shut-off valve by rotating the pin element in relation to the body in a first direction, thereby forcing the sealing element to move from the first position to the second position and thus allowing the pressurised gas to flow between the gas inlet channel and the gas outlet channel through the passage; and closing the shut-off valve by rotating the pin element in relation to the body in a second direction, thereby allowing the sealing element to move from the second position to the first position due to the biasing element and thus prevent the pressurised gas from flowing between the gas inlet channel and the gas outlet channel through the passage.

17. The shut-off valve according to claim 1, wherein the sealing element, the pin element, and the biasing element are each disposed within the body so that the shut-off valve is attachable to and removable from a gas source as a single unit.

18. A shut-off valve for controlling flow of a pressurised gas, comprising:

a body defining a passage extending between a gas inlet channel and a gas outlet channel, the passage including a first conduit and a second conduit that each extend transversely to a direction which the gas inlet channel and the gas outlet channel extend;

a sealing element arranged to, in a first position, close the second conduit, and in a second position, open the second conduit to allow a gas flow exiting the first conduit to reverse its flow direction and flow through the second conduit so that the gas flow can flow between the gas inlet channel and the gas outlet channel through the passage;

a pin element at least partly arranged in the second conduit, the pin element including a restrictor at a first end which is in contact with the sealing element; and a biasing element for biasing a first end of the sealing element such that a second end of the sealing element is in contact with the pin element, wherein, the pin element allows the gas flow to leave the second conduit in a radial direction of the pin element.

19. The shut-off valve according to claim 18, wherein the restrictor surrounds the pin element in a circumferential direction and is tapering in an axial direction from the first end.

20. The shut-off valve according to claim 18, wherein the first conduit is parallel to the second conduit.

* * * * *